United States Patent [19]

Ferrante

[11] Patent Number: 5,685,383

[45] Date of Patent: Nov. 11, 1997

[54] MODULAR ROBOT

[75] Inventor: Todd A. Ferrante, Idaho Falls, Id.

[73] Assignee: Lockheed Idaho Technologies Company, Idaho Falls, Id.

[21] Appl. No.: 502,449

[22] Filed: Jul. 14, 1995

[51] Int. Cl.[6] .................................................. B62D 57/02
[52] U.S. Cl. .................................................. 180/8.6; 901/1
[58] Field of Search ........................... 180/8.1, 8.3, 8.4, 180/8.5, 8.6; 901/1

[56] References Cited

U.S. PATENT DOCUMENTS

| 3,224,734 | 12/1965 | Hill . | |
|---|---|---|---|
| 3,326,008 | 6/1967 | Baran et al. . | |
| 3,330,368 | 7/1967 | Baran et al. . | |
| 3,765,499 | 10/1973 | Harmala | 180/8.5 |
| 3,842,926 | 10/1974 | Williams et al. | 180/8.6 |
| 4,202,423 | 5/1980 | Soto . | |
| 4,372,161 | 2/1983 | de Buda et al. . | |
| 4,527,650 | 7/1985 | Bartholet . | |
| 4,558,758 | 12/1985 | Littman et al. . | |
| 4,834,200 | 5/1989 | Kajita . | |
| 4,872,524 | 10/1989 | O'Connor . | |
| 5,005,658 | 4/1991 | Bares et al. . | |
| 5,040,626 | 8/1991 | Paynter . | |
| 5,121,805 | 6/1992 | Collie . | |
| 5,127,484 | 7/1992 | Bares et al. . | |
| 5,151,859 | 9/1992 | Yoshino et al. . | |
| 5,413,454 | 5/1995 | Movsesian | 901/1 |

OTHER PUBLICATIONS

Advertisement by ICSensors.
Advertisement by Eastern Plastics, Inc.
Advertisement by Onset Computer.
Advertisement by Manx Software Systems.
Hitachi Review, vol. 36 (1987), No. 2, pp. 71–78, "Development of the Legged Walking Robot," by Ichiro Kato et al. Apr. 1987.
Hydraulics and Pneumatics, Aug. 1970, "Electrohydraulic servos control walking machine," by Henry Lefer, pp. 63–65 Aug. 1970.

*Primary Examiner*—Kevin Hurley
*Assistant Examiner*—Gary Savitt
*Attorney, Agent, or Firm*—Klass Law O'Meara & Malkin

[57] ABSTRACT

A modular robot may comprise a main body having a structure defined by a plurality of stackable modules. The stackable modules may comprise a manifold, a valve module, and a control module. The manifold may comprise a top surface and a bottom surface having a plurality of fluid passages contained therein, at least one of the plurality of fluid passages terminating in a valve port located on the bottom surface of the manifold. The valve module is removably connected to the manifold and selectively fluidically connects the plurality of fluid passages contained in the manifold to a supply of pressurized fluid and to a vent. The control module is removably connected to the valve module and actuates the valve module to selectively control a flow of pressurized fluid through different ones of the plurality of fluid passages in the manifold. The manifold, valve module, and control module are mounted together in a sandwich-like manner and comprise a main body. A plurality of leg assemblies are removably connected to the main body and are removably fluidically connected to the fluid passages in the manifold so that each of the leg assemblies can be selectively actuated by the flow of pressurized fluid in different ones of the plurality of fluid passages in the manifold.

29 Claims, 9 Drawing Sheets

MODULAR ROBOT

CONTRACTUAL ORIGIN OF THE INVENTION

The Uunited States Government has rights in this invention disclosed under contract number DE-AC07-84ID12435 between the U.S. Department of Energy and Westinghouse Idaho Nuclear Company, now contract number DE-AC07-94ID13223 with Lockheed Idaho Technologies Company.

FIELD OF THE INVENTION

This invention relates to robotic apparatus in general and more specifically to a reconfigurable modular walking robot.

BACKGROUND OF THE INVENTION

Self propelled autonomous robots are being used with increasing frequency to perform tasks or work in environments that are hazardous to humans. For example, self propelled robots are often used to work with radioactive materials or in radioactive environments. They are also being seriously considered as a means for economically exploring other planets in the solar system. While many different kinds of such self-propelled robots exist or have been proposed, they generally can be grouped into one of two classes: Wheeled robots and walking robots.

As the name suggests, wheeled robots move across the ground on wheels or, alternatively, wheeled track assemblies much like a tank. Wheeled robots are particularly well suited to relatively fast movement across relatively smooth terrain. However, wheeled robots have difficulty traversing rough or uneven terrain, or terrain that is filled with obstacles. Consequently, the use of wheeled robots tends to be limited to those applications where they are expected to encounter only relatively smooth terrain free of obstructions.

Walking robots differ from wheeled robots in that they include a plurality of moveable legs, thus allowing the robot to walk across the ground. Walking robots are thus able to traverse relatively rough and uneven terrain and can even cope with moderately sized obstacles. Unfortunately, however, the ability to traverse rugged and/or obstacle filled terrain comes at the expense of substantially increased complexity in the design of the leg members and the walking control system. Consequently, wheeled robots, which have the advantage of simpler design and construction, are generally preferred for most applications.

Unfortunately, as wheeled robots are made smaller and smaller, terrain that was once passible for a relatively large wheeled robot having relatively large wheels suddenly becomes impassible for a smaller wheeled robot having smaller wheels. Thus, while it would be desirable to use such smaller robots in most applications, the inability of many of the smaller wheeled robots to traverse relatively uneven terrain substantially limits their use. Consequently, where small robots are required, they tend to be of the walking design, which are less affected by variations in terrain.

Most currently available smaller robots of the walking type are electro-mechanical in design. That is, they utilize small DC motors and gearboxes to provide the motive force required to move the various legs. Unfortunately, such electro-mechanical designs are quite complex and are difficult and expensive to manufacture. They also tend to be relatively fragile and may be prone to frequent break-downs.

Consequently, there remains a need for a small, self-propelled robot that is capable of traversing relatively uneven terrain, but that does not require cumbersome and complex mechanical drive arrangements, such as electric motors and complicated gearbox and drive arrangements. Ideally, such a walking robot would be pneumatically or hydraulically powered, while at the same time being relatively small and light-weight. Additional utility could be realized if such a robot were readily reconfigurable for use in a wide range of applications.

SUMMARY OF THE INVENTION

A modular robot may comprise a main body having a structure defined by a plurality of stackable modules. The stackable modules may comprise a manifold, a valve module, and a control module. The manifold may comprise a top surface and a bottom surface having a plurality of fluid passages contained therein, at least one of the plurality of fluid passages terminating in a valve port located on the bottom surface of the manifold. The valve module is removably connected to the manifold and selectively fluidically connects the plurality of fluid passages contained in the manifold to a supply of pressurized fluid and to a vent. The control module is removably connected to the valve module and actuates the valve module to selectively control a flow of pressurized fluid through different ones of the plurality of fluid passages in the manifold. The manifold, valve module, and control module are mounted together in a sandwich-like manner and comprise a main body. A plurality of leg assemblies are removably connected to the main body and are removably fluidically connected to the fluid passages in the manifold, so that each of the leg assemblies can be selectively actuated by the flow of pressurized fluid in different ones of the plurality of fluid passages in the manifold.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
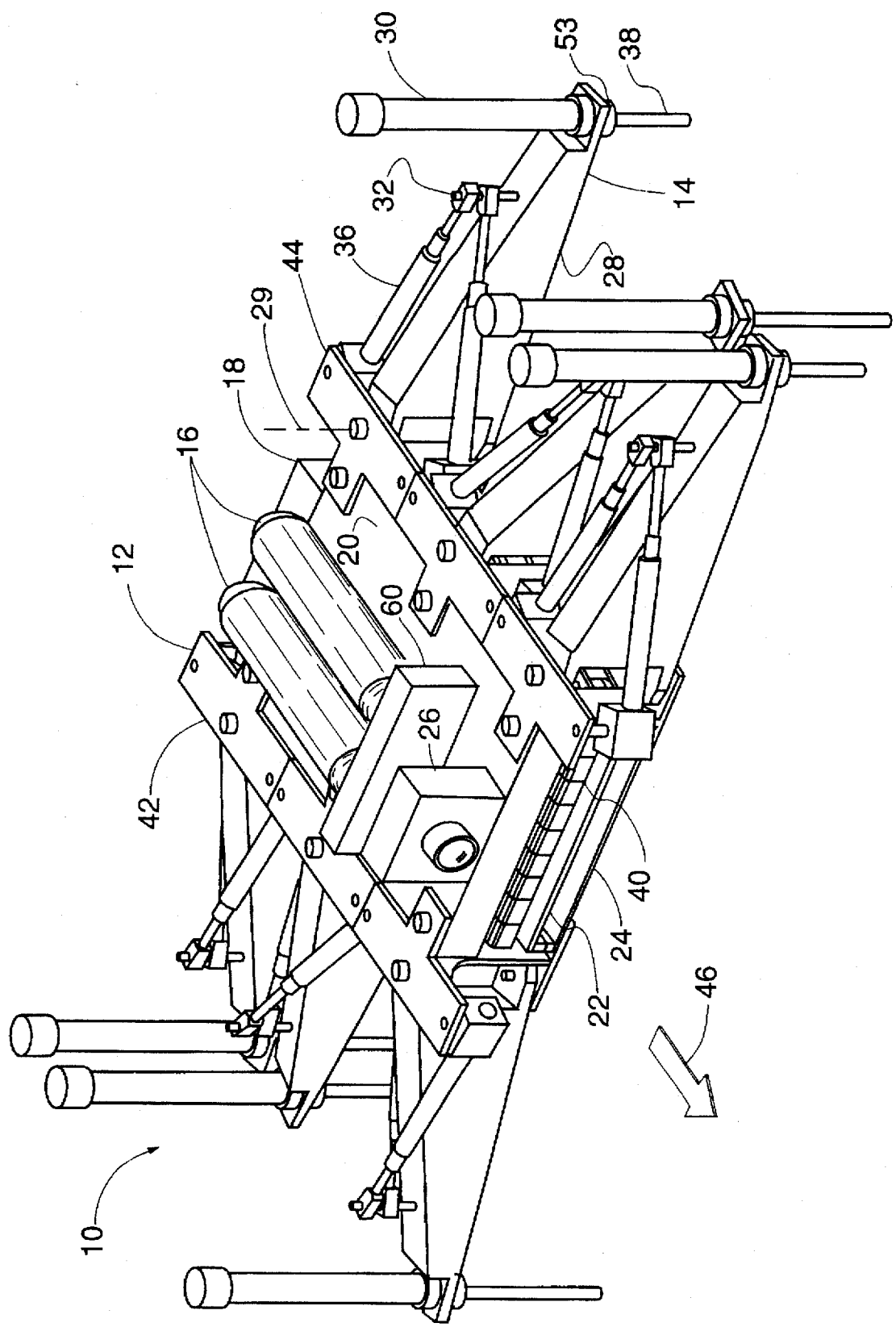
FIG. 1 is a perspective view of the upper side of a modular walking robot according to the present invention having single acting upper leg actuators.
Figure 2:
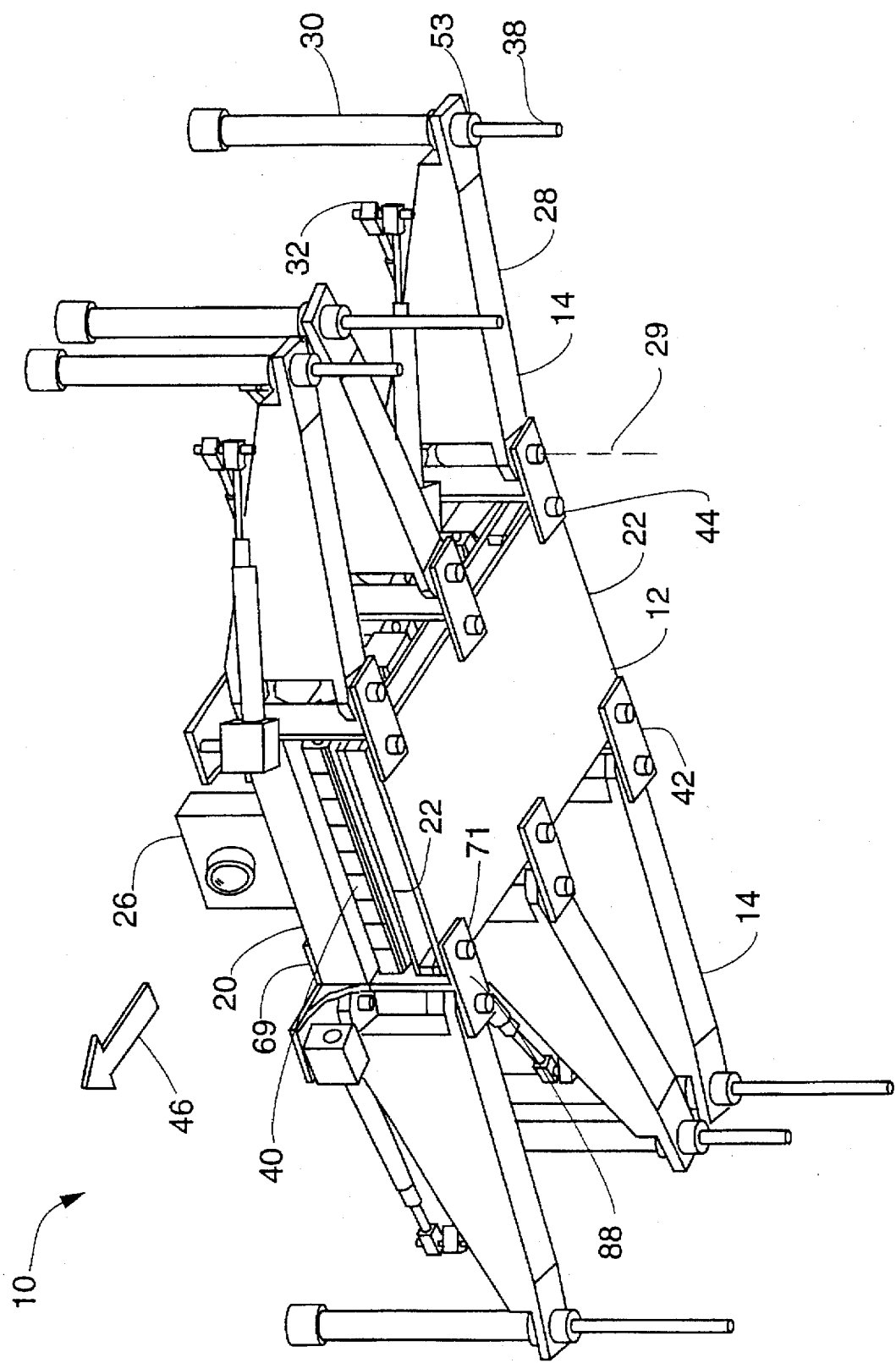
FIG. 2 is a perspective view of the lower side of the modular walking robot shown in FIG. 1.

A modular walking robot 10 according to the present invention is best seen in FIGS. 1 and 2 and may comprise a main body 12, a plurality of removably attachable leg assemblies 14, a supply of pressurized fluid, such as air or $CO_2$, contained within a pair of tanks 16, and a source of electrical power, such as a battery 18. The main body assembly 12 is modular and comprises a detachable manifold 20, a detachable valve module assembly 22, and a detachable control module assembly 24. The modular walking robot 10 may also include an optional camera assembly 26 for producing visual image data signals of various objects (not shown) located around the robot 10.

Figure 7:
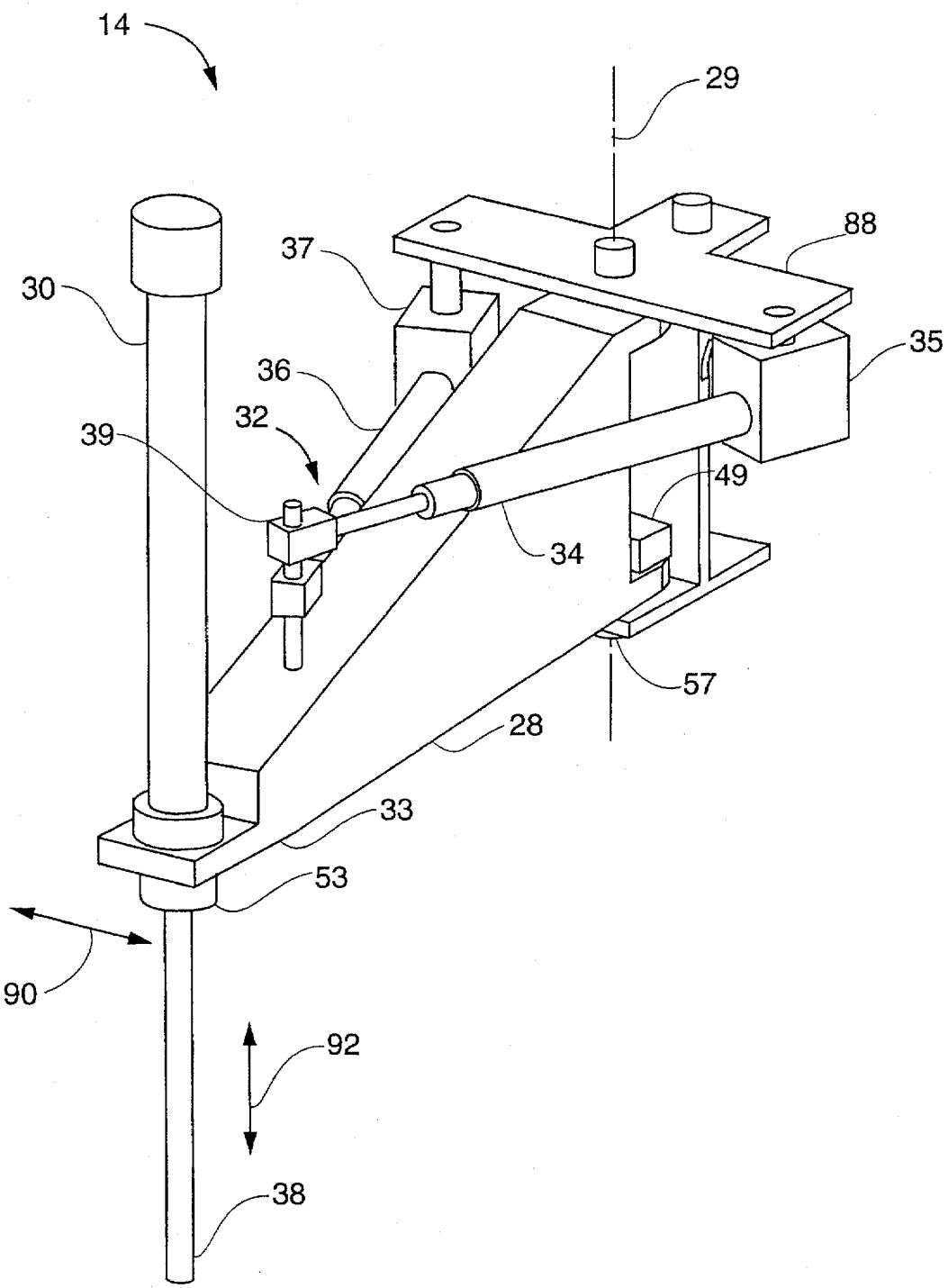
FIG. 7 is an enlarged view in perspective of a leg assembly showing the arrangement of the single acting upper leg actuators.

Each leg assembly 14 is designed to be easily removable from the main body 12 and may comprise an upper leg member 28 and a lower leg member 30. The upper leg member 28 is pivotally mounted to the main body 12 along leg pivot axis 29 so that leg assembly 14 can be pivoted back and forth by an upper leg actuator assembly 32, as best seen in FIG. 7. In one embodiment, upper leg actuator assembly 32 may comprise a front fluidic cylinder 34 and a rear fluidic cylinder 36, although a single, dual-acting fluidic cylinder 136 (FIG. 10) may also be used. The lower leg member 30 may comprise a single-acting fluidic cylinder with an extendable and retractable ground engaging tip portion 38 for engaging the ground (not shown) and supporting the modular robot 10. Each leg assembly 14 is thus entirely fluidically actuated, with the motive power for actuation (i.e., walking) coming from the supply of pressurized fluid contained within the pair of tanks 16.

The flow of pressurized fluid from the tanks 16 to the various individual fluidic actuators (e.g., 30, 34, 36) on each leg assembly 14 is controlled by a plurality of valves 46 (best seen in FIG. 3) mounted to the valve module assembly 22. Each valve 40 is electrically controlled by the control module assembly 24 to coordinate the movement of the various leg assemblies 14, thus allowing the modular robot 10 to "walk" in the desired direction, as will be described in greater detail below. In one preferred embodiment, the valves 40 used to actuate the leg assemblies 14 comprise silicon microvalves that can continuously vary the flow of pressurized fluid from a no flow state to a full flow state in proportion to a valve control signal 87 (FIG. 6) produced by the control module assembly 24.

During operation, then, the control module assembly 24 actuates the various valves 40 on the valve module assembly 22, which in turn control the flow of pressurized fluid to the various leg actuators and cause the modular robot 10 to "walk" in the desired direction. For example, the modular robot 10 may be moved in the forward direction (indicated by arrow 46) in an insect-like fashion by selectively actuating various ones of the upper leg members 28 and ground engaging tip portions 38 of the leg assemblies 14 to achieve a walking motion. The six-legged arrangement allows the robot to be supported by at least three legs, two on one side and one on the other, at any given moment.

The modular design of the robot 10 according to the present invention carries with it several advantages. For example, different leg assemblies 14 may be easily removed and attached to the body portion 12 of the robot 10 to replace worn leg assemblies or to replace the walking type of leg assemblies 14 with wheeled type leg assemblies 214 (FIG. 12) thus convert the robot 10 to wheeled operation. The modular design also allows different leg assemblies 14, manifolds 20, or valve module assemblies 22 to be connected together to change the means of locomotion of the robot (e.g., walking or rolling) or the functional logic of the valve module assembly 22. The control module assembly 24 may also be replaced with another type of control module having different programming to accommodate different leg assemblies 14, manifolds 20, or valve modules 22. Thus, many different kinds of robots 10 may be created by simply assembling various combinations of leg assemblies 14, manifolds 20, valve module assemblies 22, and control module assemblies 24 to customize the robot 10 for use in nearly any imaginable application.

Another significant advantage of the modular robot 10 is that it does not require relatively complex and expensive electro-mechanical actuators, such as motors and gearboxes or complicated linkages to move the legs. As a result, robots 10 according to the present invention tend to be far more mechanically robust and are less prone to breakdown. The fluidic actuation of the leg assemblies 14 also allows the robot 10 to be safely operated in explosive atmospheres.

Another advantage is that the continuously variable silicon microvalves 40 allow for more accurate and precise control of the leg assemblies 14 than could be achieved with conventional solenoid valves, which are operable in only in an "on" state or an "off" state. The silicon microvalves are also considerably smaller and lighter than, conventional solenoid actuated fluidic valves, thus allowing the robot 10 to be made very small and lightweight, which, of course, allows the robot 10 to be used in applications that were previously impracticable for much larger and heavier fluidic powered robots.

Having briefly described the modular robot 10, as well as several of its more significant features and advantages, various specific embodiments of the invention will now be described in detail. Referring now to FIGS. 1 and 2 simultaneously, a first embodiment 10 of a modular walking robot may comprise a modular main body 12, a plurality of removably attachable leg assemblies 14, a supply of pressurized fluid, such as compressed air or $CO_2$, and a source of electrical power, such as a battery 18. The modular walking robot 10 may also be fitted with a plurality of sensor devices, such as a camera assembly 26 for producing visual image data of various objects (not shown) around the robot 10. In the embodiment shown in FIGS. 1 and 2 the visual image data produced by the camera 26 may be telemetered to a suitable display device, such as a CRT (not shown), at a remote location.

Six individual leg assemblies 14 are attached to the main body 12 of robot 10. Three such leg assemblies 14 are attached to the right side 42 of body 12 at forward, intermediate, and aft positions, with the forward position being referenced with respect to the forward direction 46. Similarly, three leg assemblies 14 are attached to the left side 44 of body 12 at forward, intermediate, and aft positions. So arranged, the leg assemblies 14 may be actuated in a wide variety of sequences to allow the robot to "walk" in an insect-like manner in the forward direction 46 and in the backward direction opposite arrow 46. The robot 10 may also be turned left and right while moving in either the forward or backward directions by changing the stride length of the leg assemblies 14, as will be explained in greater detail below.

As was briefly mentioned above, each of the six leg assemblies 14 are entirely fluidically actuated and, in one preferred embodiment, are actuated by compressed carbon dioxide ($CO_2$) contained within tanks 16. The tanks 16 are connected to a supply manifold 60, which allows exhausted tanks to be easily removed and replaced with freshly charged tanks. Alternatively, other compressed fluids, such as air, may be used, or the tanks themselves may be replaced with a pneumatic pump (not shown) to provide a continuous supply of compressed air. In still another embodiment, the on-board tanks or pump-may be eliminated in favor of tethering the robot 10 to a remote source of pressurized fluid (not sheen). The battery 18 is mounted to the main body 12 and provides electrical power for the valve and control module assemblies 22 and 24, respectively. It is preferred, but not required, that the battery 18 be removably mounted to the body 12 and connected by means of a suitable electrical connector (not shown) to allow an exhausted battery 18 to be replaced with a fresh battery. Alternatively, the battery 18 may be permanently mounted to the body 12 and may be of the rechargeable type. As was the case for the tanks and pump, the on-board battery may be eliminated in favor of tethering the robot to an external source of electrical power (not shown).

Figure 4:
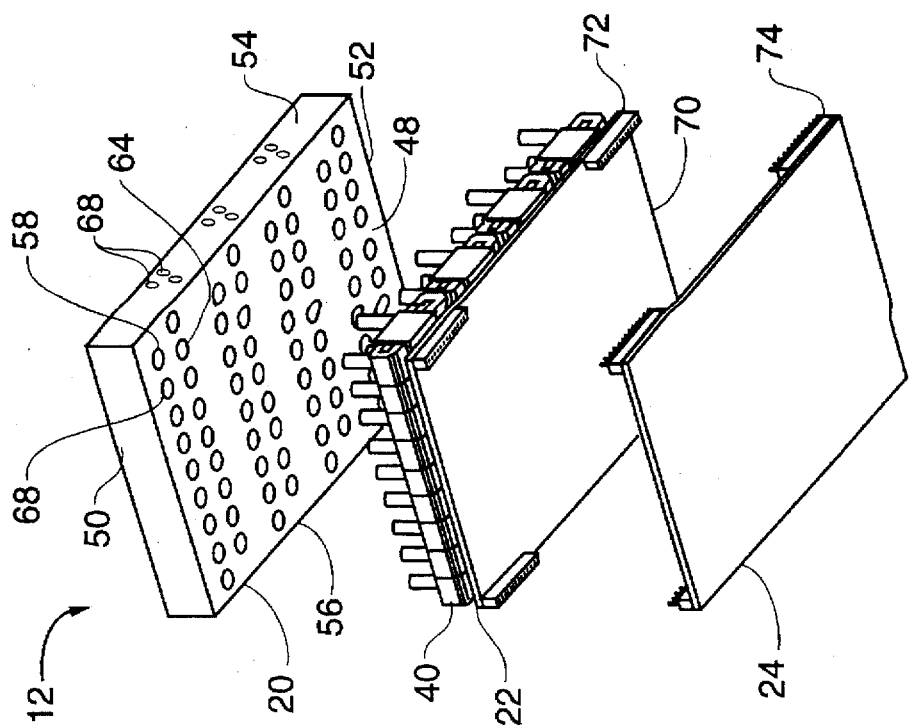
FIG. 4 is an exploded view in perspective showing the lower surfaces of the manifold, valve module, and control module assemblies.
Figure 3:
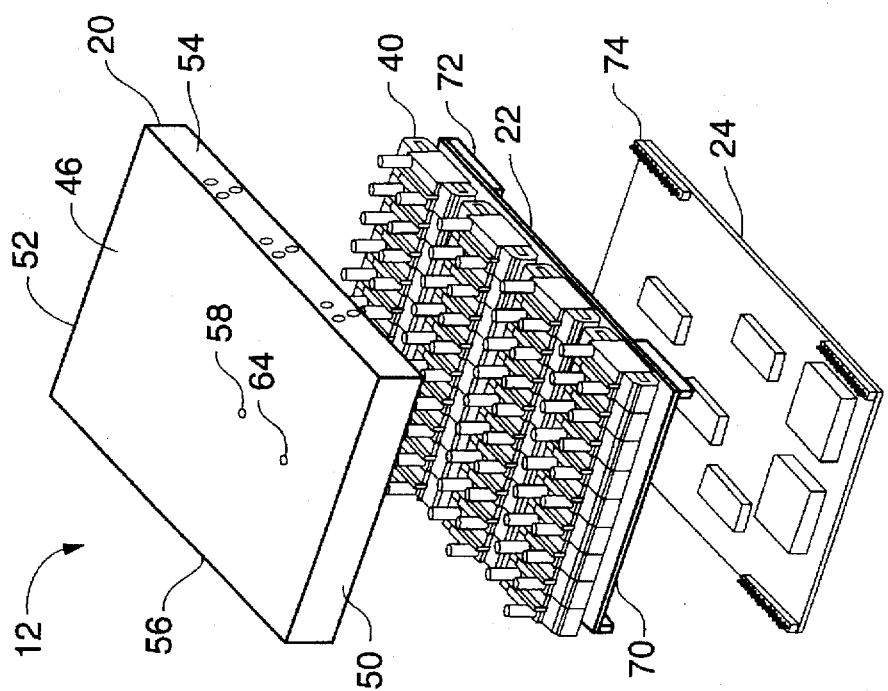
FIG. 3 is an exploded view in perspective showing the upper surfaces of the manifold, valve module, and control module assemblies.
Figure 5:
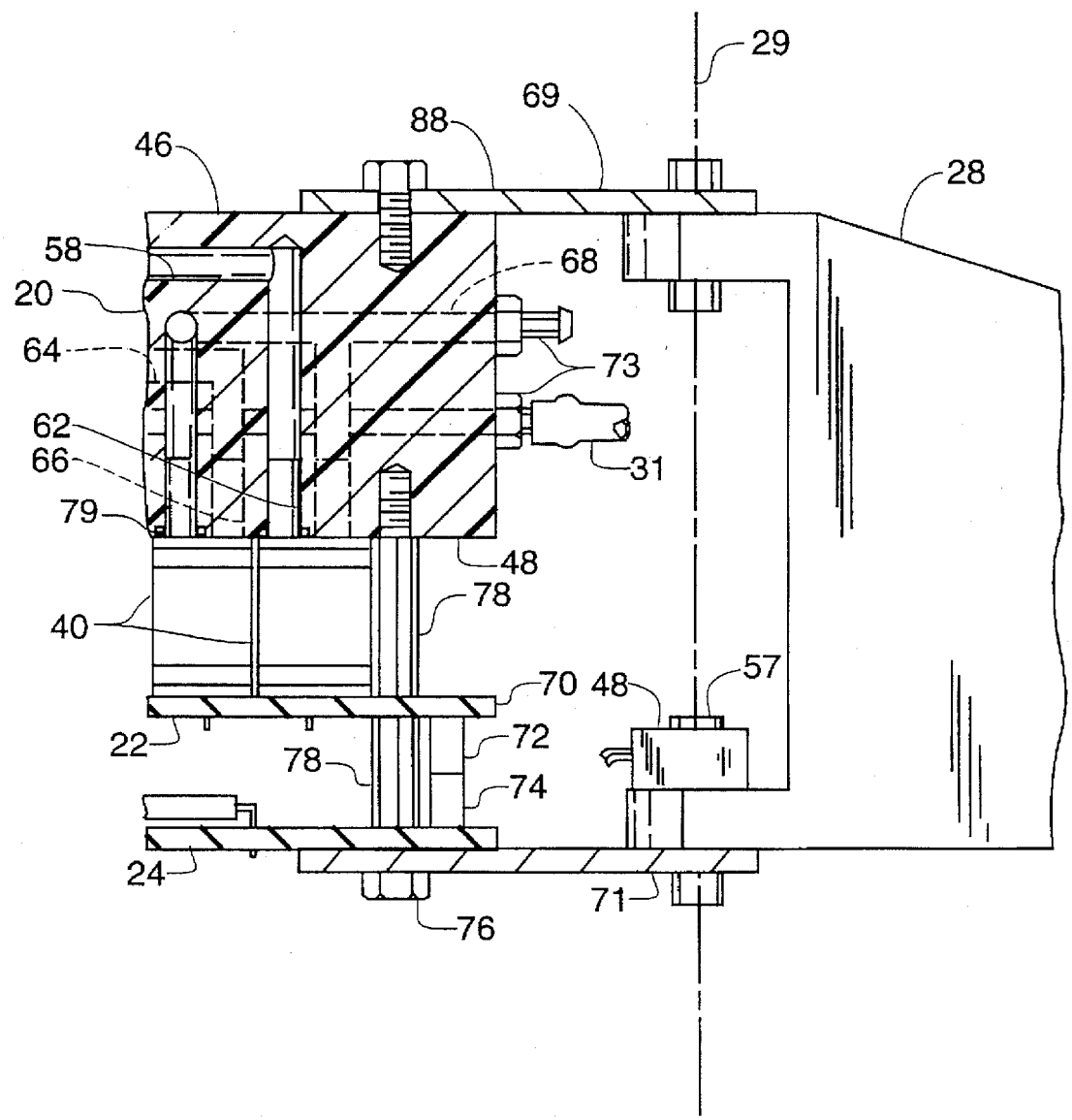
FIG. 5 is a sectional view in elevation of the manifold, valve module, control module, and upper leg assemblies.

Referring now to FIGS. 3, 4, and 5, the main body 12 of robot 10 comprises three modules or sub-assemblies, namely, the manifold 20, the valve module assembly 22, and the control module assembly 24, all of which are fastened together in a sandwich-like manner to form the single unitary main body 12. The three sub-assemblies 20, 22, and 24 are removably mounted to one another to allow easy replacement of one or more sub-assemblies 20, 22, and 24 to change the operating characteristics of the robot 10. For example, the manifold 20 may be replaced with a different manifold (not shown) having different air paths to accommodate different kinds of leg assemblies 14. Similarly, the valve module assembly 22 may be changed either together with the manifold 20 or separately to affect a change in the functional logic of the robot 10. The control module assembly 24 may also be replaced in a like manner with a different control module assembly (also not shown) having different control algorithms and programming. Again, the control module assembly 24 may be changed independently of, or in conjunction with, the leg, manifold, or valve module assemblies 14, 20, and 22, respectively.

The manifold 20 forms a substantial part of the main body 12 and comprises a generally rectangular shaped block having a top surface 46, a bottom surface 48, a front side 50, a back side 52, a left side 54, and a right side 56. The manifold 20 contains a plurality of fluidic passages therethrough to provide pathways for selectively pressurizing and venting the various fluidic actuators on the leg assemblies 14. More specifically, the manifold 20 comprises a common supply passage 58 that is in fluid communication with the supply manifold 60 (FIG. 1) and the inlet port 62 of various ones of valves 40, as best seen in FIGS. 4 and 5. Of course, the specific ones of valves 40 that have their inlet ports 62 in fluid communication with the common supply passage 58 depends on the arrangement of the various fluidic actuators, such as actuators 30, 34, and 36, that are used to actuate a particular leg assembly 14, as will be described in greater detail below. Manifold 20 also includes a common vent passage 64 that is in fluid communication with the outlet ports 66 of various ones of valves 40, as is best seen in FIGS. 3 and 5. Finally, manifold 20 also comprises a plurality of leg passages 68 to fluidically connect the valves 40 to the various fluidic actuators, such as actuators 30, 34, and 36 of each leg assembly 14.

The manifold 20 may be made from a wide variety of materials, such as plastic, rubber, aluminum, or any other material capable of providing pressure tight fluidic passages therethrough. In one preferred embodiment, the manifold 20 is made from plastic and can be manufactured with a wide variety of fluid passage configurations by Eastern Plastics, Inc., of 93 West Main Street, Plainville, Conn. 06062.

The details of the valve module assembly 22 are also best seen in FIGS. 3–5. Essentially, valve module assembly 22 comprises a generally rectangular valve support board 70 for supporting a plurality of silicon microvalves 40. Valve support board 70 may be a conventional printed wiring board having a plurality of electrically conductive printed circuit paths thereon (not shown) for electrically connecting the various valves 40 to a plurality of electrical connectors 72 adapted to receive mating connectors 74 mounted to the control module assembly 24. The valves 40 may be arranged on the support board 70 in any convenient manner consistent with the total number of valves 40 required to actuate the various leg assemblies 14 as well as on the specific layout of the various passages, such as passages 58, 64, and 68, located on the bottom surface 48 of manifold 20. In the embodiment shown in FIGS. 3–5, the various valves 40 are arranged in four rows of nine valves 40 each for a total of thirty-six valves 40, which is the total number of valves 40 required to operate the six leg assemblies 14, as will be explained in more detail below.

As was mentioned above, the valves 40 in one preferred embodiment may comprise silicon microvalves that are capable of continuously varying the flow from a no flow state to a full flow state in proportion to the valve actuation signals 87 (FIG. 6) produced by the control module assembly 24. Continuous control of the gas flow rate through the silicon microvalves 40 allows for more precise control of the leg assemblies 14 compared to conventional solenoid-type fluidic valves that can only be switched between an "on" or full flow state and an "off" or no flow state. In the embodiment shown in FIGS. 3–5, the silicon microvalves 40 may comprise model 4425 silicon microvalves manufactured by IC Sensors, Inc., of 1701 McCarthy Boulevard, Milpitas, Calif. 95035.

The valve control module 22 and control module assembly 24 are secured to the manifold 20 by means of suitable fasteners, such as bolts 76 and standoffs 78, as best Seen in FIG. 5. Alternatively, the manifold 20, valve control module 22 and control module 24 may be held together by the two opposed flanges 69 and 71 of bracket 88, as best seen in FIG. 2. If the manifold 20 is made from rubber or plastic, then a pressure-tight seal may be accomplished by the interference fit between the various passages, such as passages 58, 64, and 68, in manifold 20 and the various inlet and outlet ports 62 and 66 of valves 40. Alternatively, separate sealing devices, such as O-ring seals 79, may be used to provide a pressure tight seal between the inlet and outlet ports 62 and 66 and the various passages in manifold 20. Manifold 20 may also be provided with a plurality of barbed tubing fittings 73 to facilitate fluidic connection to the various fluidic actuators 30, 34, and 36 of each leg assembly 14 by any convenient means, such as, for example, by a flexible hose 31. As was described above, the modular arrangement of the manifold 20, valve module assembly 22, and control module assembly 24, allow any of the three components to be replaced with corresponding components having different configurations and/or control programming to accommodate different robot configurations, leg assemblies 14, and or robot missions.

Figure 6:
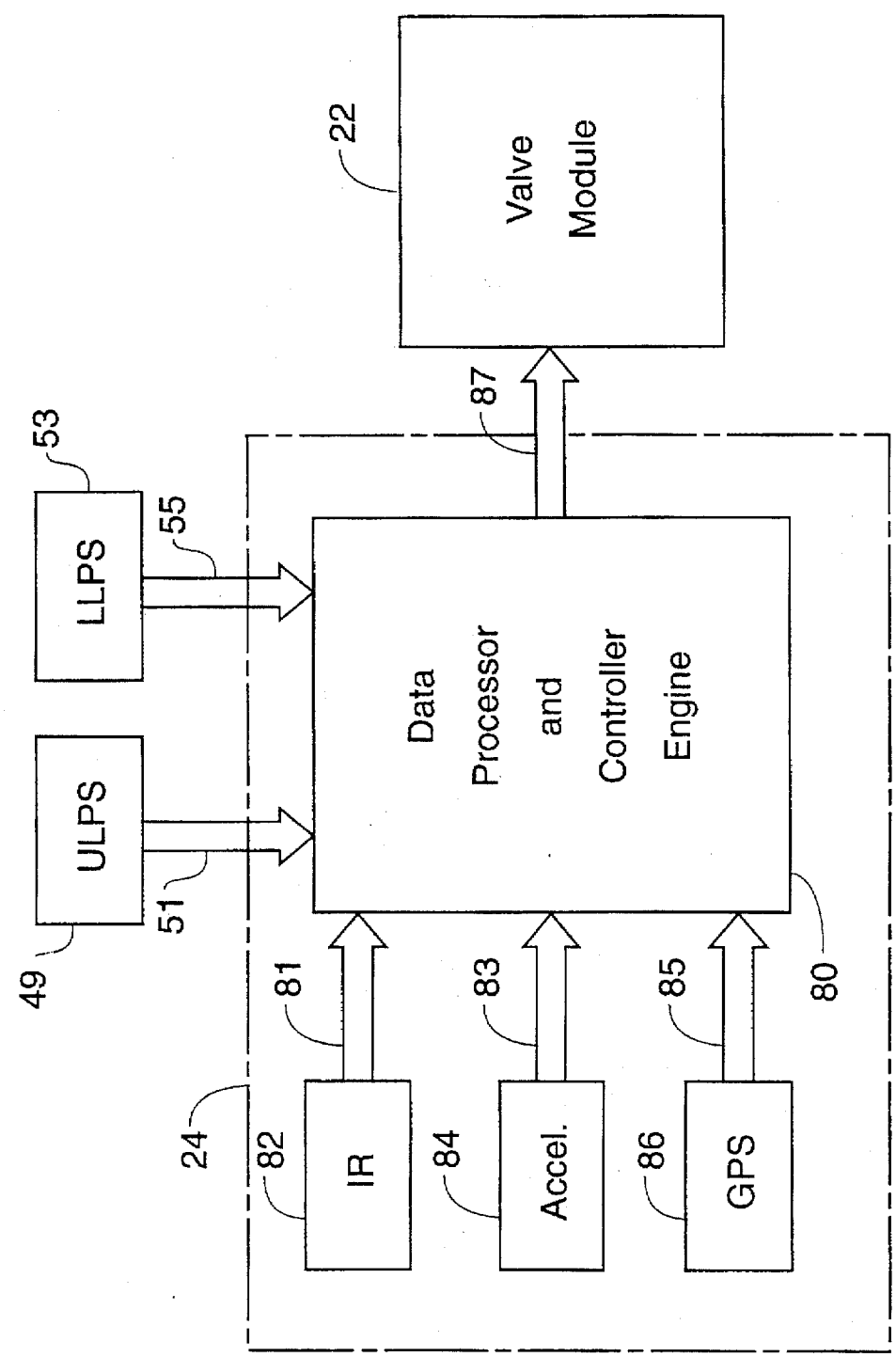
FIG. 6 is a block diagram of the control module assembly according to the present invention.

Referring now to FIG. 6, the control module assembly 24 may comprise a programmable data processor and controller engine 80, as well as a variety of object and position sensors, such as, for example, an infra red (IR) sensor 82, acceleration sensors 84, and a global position sensor (GPS) 86. The programmable data processor and controller engine 80 forms the heart of the control module assembly 24 and may be programmed with the various control algorithms required to actuate the various leg assemblies 14 (FIG. 1) to move the robot in the desired direction. More specifically, the programmable data processor and controller engine 80 collects input data signals 81, 83, and 85 from the respective sensors 82, 84, and 86 and processes those input data signals along with the various control algorithms to generate a plurality of valve actuation signals 87 suitable for actuating the valves 40 on the valve module 22. The programmable data processor and controller engine 80 may also receive and process feedback data relating to the positions of the various leg assemblies 14 to provide stable operation. More specifically, the programmable data processor and controller engine 80 may receive upper leg position data signals 51 produced by corresponding upper leg position sensors (ULPS) 49 and lower leg position data signals 55 produced by corresponding lower leg position sensors (LLPS) 53. While a wide variety of data processor and controller engines are available and could be used with the present invention, one preferred embodiment utilizes a Tattletale Model 8 Data Logger/Controller Engine available from Onset Computer of 536 MacArthur Boulevard, Pocasset, Mass. 02559.

The particular control algorithms required to process the input data signals, such as input data signals 81, 83, and 85, generate the appropriate valve actuation signals 87, and to control any other functions of the robot 10, such as navigation and/or collision avoidance, may be any of a wide variety of "off-the-shelf" control algorithms that have been developed by various robotic companies to control the function and operation of robots. In one preferred embodiment, the control module assembly is programmed with control algorithms available from IS Robotics of Twin City Office Center, Suite 6, 22 McGrath Highway, Somerville, Mass., 02143.

Each leg assembly 14 is identical and is best seen in FIG. 7. Essentially, leg assembly 14 may include an upper leg member 28 that is pivotally mounted to bracket 88 so that it is free to pivot about leg pivot axis 29. A lower leg member 30 is attached to the distal end 33 of upper leg member 28 and includes a ground engaging tip portion 38 that is extendable and retractable in the directions indicated by arrows 92 to engage the ground (not shown) thus provide support for the modular robot 10. An upper leg actuator assembly 32 attached to the upper leg member 28 and bracket 88 pivots the upper leg member 28 about leg pivot axis 29 so that the distal end 33 of upper leg member 28 moves back and forth in the direction indicated by arrow 90. The movement of the upper leg member 28 back and forth, combined with selectively extending and retracting the ground engaging tip portion 38 of lower leg member 30 results in the insect-like movement of the robot 10.

In one preferred embodiment, upper leg actuator assembly 32 comprises a front fluidic cylinder 34 and a rear fluidic cylinder 36. The proximal ends 35 and 37 of respective front and rear cylinders 34 and 36 are pivotally mounted to bracket 88, whereas the distal ends 39, 41 of each respective cylinder 34, 36 are pivotally mounted to a pin 43 attached to upper leg member 28. Both the forward and aft fluidic cylinders 34 and 36 are single-acting fluidic cylinders, i.e., the cylinders are powered in one direction only. Thus, alternately actuating the cylinders 34, 36 will cause the upper leg member 28 to pivot about leg axis 29, moving the distal end 33 of upper leg member 28 back and forth in the directions indicated by arrows 90.

Each leg assembly 14 also includes an upper leg position sensor 49 for sensing the position of the upper leg member 28. In one preferred embodiment, the upper leg position sensor 49 may comprise an angular position sensor mounted to bracket 88 for sensing the angular position of the upper leg pivot shaft 57. The upper leg position data signal 51 (FIG. 6) will then comprise data relating to the angular position of the upper leg member 28. Alternatively, the upper leg position sensor 49 may comprise a linear position sensor (not shown) for sensing the degree of extension of either the forward fluidic cylinder 34 or the aft fluidic cylinder 36. In that event, the upper leg position data signal 51 would comprise data relating to the degree of extension of the fluidic cylinder, i.e., either cylinder 34 or cylinder 36.

Figure 8:
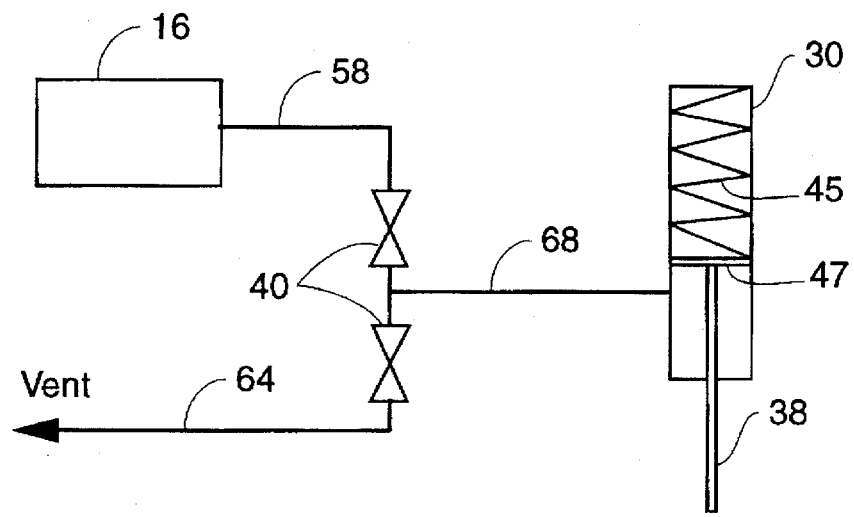
FIG. 8 is a schematic of a valve arrangement for controlling the extension and retraction of the lower leg member.

Lower leg member 30 may also comprise a single-acting fluidic cylinder, except that it may be spring biased to hold the ground engaging tip portion 38 in the extended position, as shown in FIG. 8 or in the retracted position (not shown in FIG. 8, but seen on some of the leg assemblies 14 in FIGS. 1 and 2). Thus, the alternate actuation of the lower leg member 30 will cause the ground engaging tip portion 38 to be alternately extended and retracted in the directions indicated by arrows 92 to selectively engage and disengage the ground (not shown).

The lower leg position sensor 53 may comprise a linear position sensor for sensing the degree of extension of the ground engaging tip portion 38 of lower leg member 30. The lower leg position data signal 55 (FIG. 6) will then comprise data relating to the degree of extension of the ground engaging tip portion 38.

The insect-like walking motion of the robot 10 is achieved by using the plurality of valves 40 to actuate various ones of the fluidic actuators, such as actuators 30, 34, and 36, to pivot the upper leg member 28 about leg pivot axis 29 and to selectively extend and retract the ground engaging tip portion 38 of lower leg assembly 30. For example, pivoting the upper leg members 28 of each leg assembly 14 by an equal amount will allow the robot 10 to travel in a straight line, while pivoting the upper leg members 28 by differing amounts, i.e., changing the stride length, will have the effect of turning the robot in the direction of the side 42 or 44 having the shortest stride length.

Referring now to FIG. 8, two valves 40 are required to actuate the lower leg member 30 to selectively extend and retract the ground engaging tip portion 38. As was mentioned above, it is preferred, though not required, that the lower leg member 30 comprise a single acting fluidic cylinder having a biasing member, such as a spring 45, to bias the ground engaging tip portion to the extended position. Thus, closing the valve 40 connected to the vent passage 64 and opening the valve 40 connected to the supply passage 58 allows compressed $CO_2$ from tank 16 to flow through leg passage 68 and enter lower leg member 30. The pressure exerted on piston 47 moves it upward against the spring 45, thus retracting the ground engaging tip portion 38. Conversely, closing the valve 40 connected to supply passage 58 and opening the valve 40 connected to the vent passage 64 allows the spring 45 to push the piston downward, thus extending the ground engaging tip portion 38.

Figure 9:
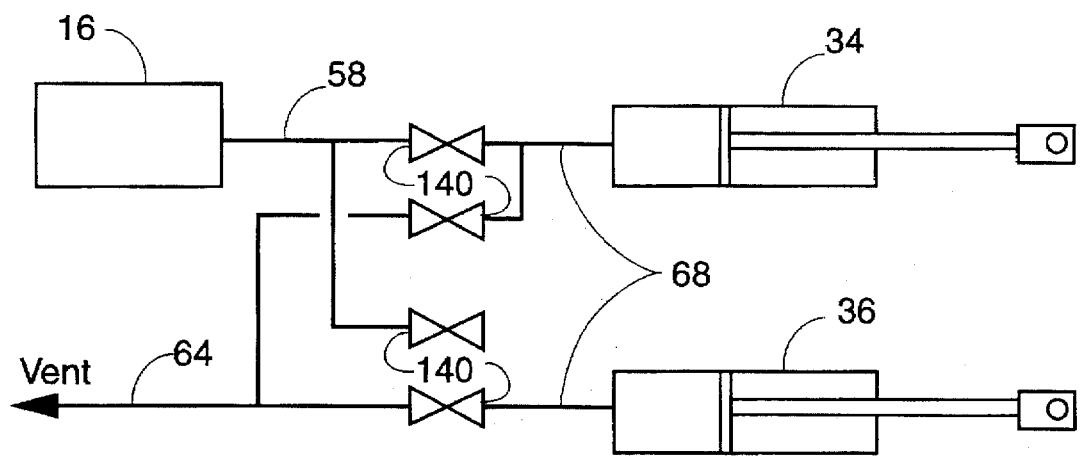
FIG. 9 is a schematic of a valve arrangement for controlling the movement of a pair of single-acting upper leg actuators.

The upper leg actuator assembly 32 is best seen in FIGS. 7 and 9 and requires four valves 40 to actuate the front and rear fluidic cylinders 34 and 36, thus pivot the upper leg member 28 about leg pivot axis 29. The operation of the valves 40 and cylinders 34 is conventional. That is, cylinder 34 may be extended by closing the valve 40 connected to the vent passage 64 and opening the valve 40 connected to the supply passage 58. Compressed $CO_2$ stored in tank 16 will then flow into the cylinder 34 via leg passage 68 in manifold 20, causing the cylinder to extend. Cylinder 36 can be extended in a like manner. However, since the distal ends 39, 41 of respective cylinders 34, 36 are connected to the pin 43, the extension of one of the cylinders 34, 36 will require that the other cylinder be vented. Accordingly, the cylinders 34, 36 may be vented by simply closing the valve 40 connected to the supply passage 58 and opening the valve 40 connected to the vent passage 64. This will allow the cylinder to be pushed back to its retracted position by the other cylinder, which is moving to its extended position.

A total of six valves 40 are required to actuate each leg assembly 14: Two valves 40 being required to actuate the lower leg member 30 and four valves 40 being required to actuate the upper leg member 28. Thus, thirty-six valves 40 are required to actuate the six separate leg assemblies 14 of robot 10.

Figure 10:
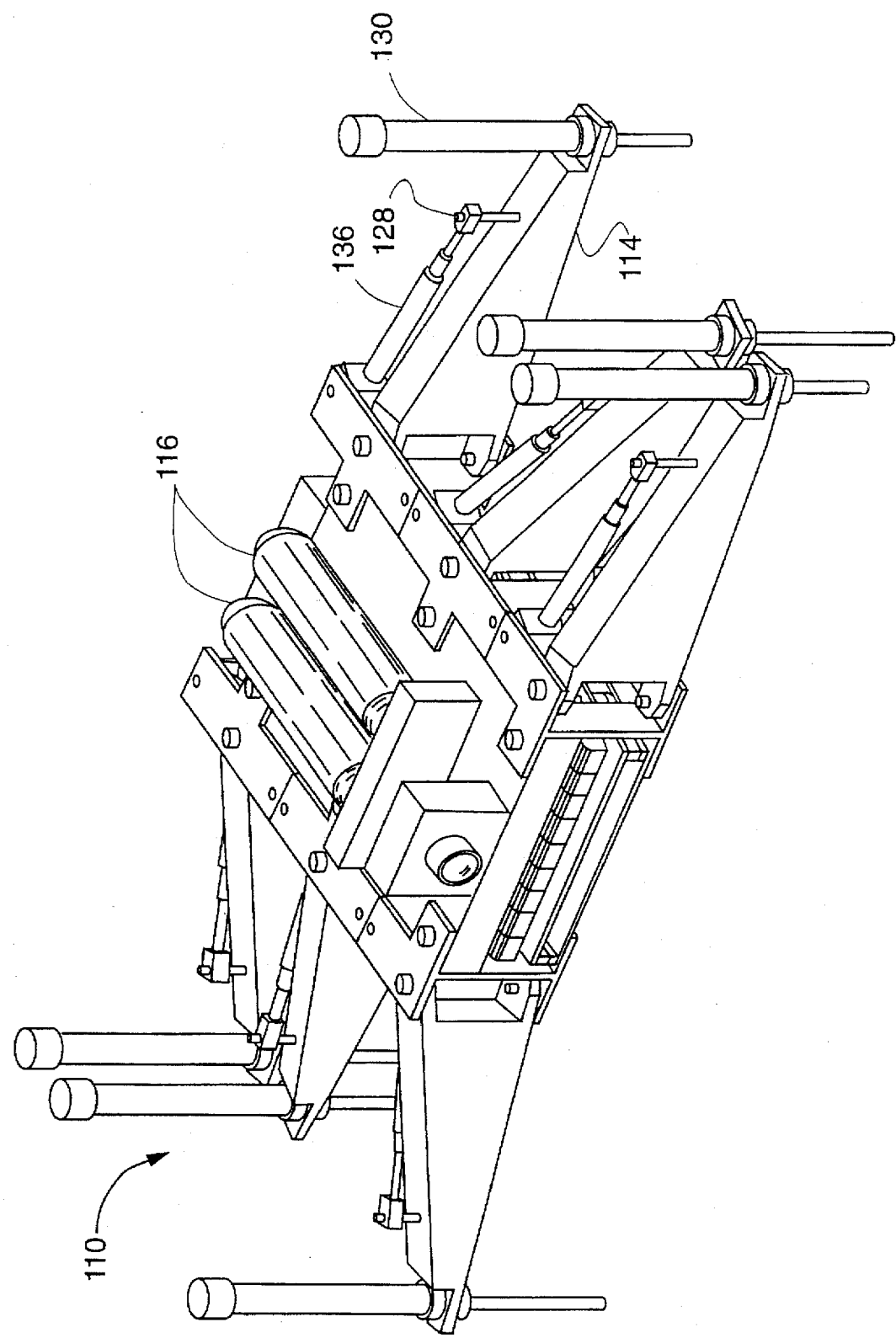
FIG. 10 is a perspective view of the upper side of a modular walking robot having dual-acting upper leg actuators.
Figure 11:
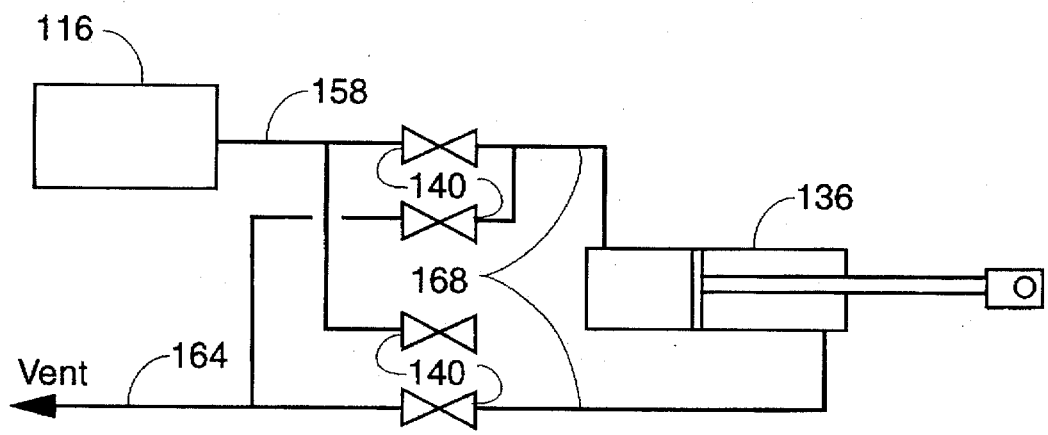
FIG. 11 is a schematic of a valve arrangement for controlling the movement of a dual acting upper leg actuator.

A second embodiment 110 of the modular robot according to the present invention is shown in FIG. 10 and is essentially identical to the first embodiment 10, except that the single acting forward and aft fluidic cylinders 34 and 36 have been replaced with single dual-acting cylinders 136. Thus, only one cylinder 136 is required to pivot the upper leg member 128 of each leg assembly 114. The lower leg member 130 is essentially identical to the lower leg member 30 used in the first embodiment 10, as was described above. As was the case for the first embodiment 10, the second embodiment 110 requires four valves 140 to alternately extend and retract the single, dual-acting fluidic cylinder 136, as shown in FIG. 11. As would be obvious to persons having ordinary skill in the art, the various valves 140 may be selectively opened and closed to connect the supply passage 158 to the leg passages 168, thus allow the compressed $CO_2$ within the tanks 116 to flow into the appropriate side of the cylinder 136. Of course, other ones of the valves 140 will need to opened and closed as necessary to connect the opposite side of the cylinder 136 to the vent passage 164.

Figure 12:
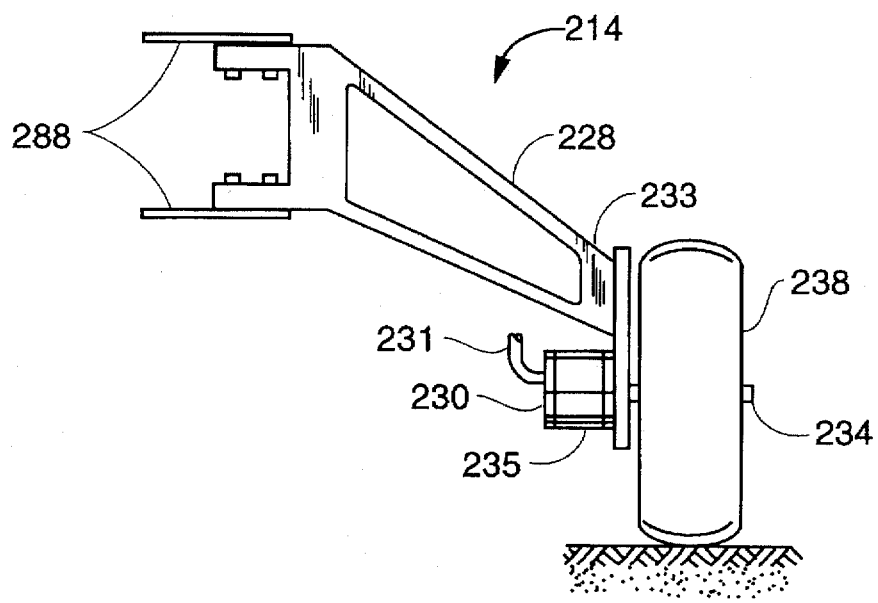
FIG. 12 is a side view in elevation of a wheeled leg assembly that can be used to replace the walking leg assembly.

Many different kinds of leg assemblies 14 may be mounted to the main body 12 of robot 10 to optimize the configuration for the expected terrain. For example, the walking type of leg assemblies 14 and 114, shown in FIGS. 1 and 10, respectively, may be replaced with a wheeled type of leg assembly 214, as shown in FIG. 12. In one preferred embodiment, the wheeled type of leg assembly 214 may comprise an elongate suspension member 228 that is fixedly mounted to a mounting bracket 288 adapted to mount to the body 12 of a robot assembly, such as robot 10, shown in FIG. 1. A wheel assembly 230 is mounted to the distal end 233 of suspension member 228 and may include a fluidic motor 235 having a wheel 238 mounted to its output shaft 234. The fluidic motor 235 may be fluidically connected to the leg passages 68 in manifold 20 (FIG. 3) by a suitable tube or hose 231.

While all of the walking type of leg assemblies 14 or 114 may be replaced with the wheeled type of leg assemblies 214 to convert the robot from a walking robot to a wheeled robot, it is also possible to replace only some of the walking type of leg assemblies 14 or 114 with wheeled type of leg assemblies 214 to create a combination wheeled and walking robot.

This completes the detailed description of the various embodiments of the modular robot according to the present invention. While a number of specific components were described above for the preferred embodiments of this invention, persons having ordinary skill in the art will readily recognize that other substitute components or combinations of components may be available now or in the future to accomplish comparable functions to the various components shown and described herein. For example, while the robots shown and described herein are powered by a supply of compressed $CO_2$, other gases, such as air, nitrogen, or argon, could also be used without departing from the spirit and scope of the present invention. Alternatively, the tanks 16 could be replaced with an on-board air pump to provide a continuous supply of compressed air to operate the robot. In still another alternative, the on-board tanks or pump could be eliminated in favor of tethering the robot 10 to a remote pressurized fluid source. Still other modifications are possible. For example, the fluid used to operate the robot need not be a gas, but instead could be a liquid, such as hydraulic fluid pressurized by a hydraulic pump (not shown) to provide a continuous supply of pressurized hydraulic fluid for operating the fluidic actuators. Also, while the embodiments shown and described herein utilize various sensors, such as infra-red, acceleration, and GPS sensors, to provide input data signals to the data processing and controller engine, other types of sensors could also be used, depending on the desired application. Likewise, the camera assembly used to provide visual image data to a remote location could be augmented with other kinds of sensors to provide nearly any type of data that may be desirable by persons located at some remote area.

In sum, then, it is contemplated that the inventive concepts herein described may be variously otherwise embodied and it is intended that the appended claims be construed to include alternative embodiments of the invention except insofar as limited by the prior art.

I claim:

1. A modular robot, comprising:
    a main body having a structure defined by a plurality of stackable modules, said plurality of stackable modules comprising
        a manifold having a top surface and a bottom surface and having a plurality of fluid passages contained therein, at least one of the plurality of fluid passages terminating in a valve port located on the bottom surface of said manifold;
        valve module means removably connected to the bottom surface of said manifold and fluidically engaging the valve port thereon, for selectively fluidically connecting at least one of the plurality of fluid passages contained in said manifold to a supply of pressurized fluid and to a vent;
        control module means removably connected to said valve module means for controlling said valve module means to selectively control a flow of pressurized fluid through at least one of the plurality of fluid passages in said manifold, wherein said manifold, said valve module means, and said control module means are stackably mounted to one another and together define the structure that comprises the main body; and
    a plurality of leg assemblies removably connected to the main body and removably fluidically connected to the plurality of fluid passages in said manifold, wherein at least one of said plurality of leg assemblies is selectively actuated by the flow of pressurized fluid in at least one of the plurality of fluid passages in said manifold to move said modular robot.

2. The modular robot of claim 1, wherein said valve module means continuously varies the flow of pressurized fluid in at least one of the plurality of fluid passages in said manifold from a no flow state to a full flow state.

3. The modular robot of claim 1, wherein each of said plurality of leg assemblies comprises:

an elongate upper leg member having a proximal end and a distal end, the proximal end of said elongate upper leg member being pivotally connected to the body so that said elongate upper leg member can be pivoted about a leg pivot axis;

upper leg actuator means connected to the body and to said elongate upper leg member and responsive to the flow of pressurized fluid for moving said elongate upper leg member back and forth about the leg pivot axis;

an elongate lower leg amber having a ground engaging tip portion and being mounted to the distal end of said elongate upper leg member so that said ground engaging tip portion can be engaged with the ground, said ground engaging tip portion of said elongate lower leg member also being extendable and retractable and fluidically connected to one of the plurality of fluid passages in said manifold so that said ground engaging tip portion of said elongate lower leg member can be extended and retracted in response to the flow of pressurized fluid to selectively engage and disengage the ground.

4. The modular robot of claim 3, wherein said upper leg actuator means comprises a dual acting fluidic cylinder having a proximal end and a distal end, the proximal end of said dual acting fluidic cylinder being mounted to the body and the distal end of said dual acting fluidic cylinder being mounted to said elongate upper leg member, said dual acting fluidic cylinder being extendable and retractable and fluidically connected to one of said plurality of fluid passages in said manifold so that said dual acting fluidic cylinder can be extended and retracted in response to the flow of pressurized fluid to move said elongate upper leg member back and forth about said leg pivot axis.

5. The modular robot of claim 3, wherein said upper leg actuator means comprises:

a first single acting fluidic cylinder having a proximal end and a distal end, the proximal end of said first single acting fluidic cylinder being mounted to the body on one side of said elongate upper leg member and the distal end of said first single acting fluidic cylinder being mounted to said elongate upper leg member, said first single acting fluidic cylinder also being extendable and retractable and fluidically connected to one of the plurality of fluid passages in said manifold so that said first single acting fluidic cylinder can be extended in response to the flow of pressurized fluid to move said elongate upper leg member in a first direction about said leg pivot axis; and a second single acting fluidic cylinder having a proximal end and a distal end, the proximal end of said second single acting fluidic cylinder being mounted to the body on the other side of said elongate upper leg member and the distal end of said second single acting fluidic cylinder being mounted to said elongate upper leg member, said second single acting fluidic cylinder also being extendable and retractable and fluidically connected to one of the plurality of fluid passages in said manifold so that said second single acting fluidic cylinder can be extended in response to the flow of pressurized fluid to move said elongate upper leg member in a second direction about said leg pivot axis.

6. The modular robot of claim 1, wherein each of said plurality of leg assemblies comprises:

an elongate suspension member having a proximal end and a distal end, the proximal end being fixedly mounted to said manifold so that said distal end extends generally downward; and a wheel assembly mounted to the distal end of said elongate suspension member, said wheel assembly being fluidically connected to one of said plurality of fluid passages and responsive to the flow of pressurized fluid.

7. The modular robot of claim 6, wherein said wheel assembly comprises a fluidic motor having a shaft and a wheel attached to the shaft of said fluidic motor, said fluidic motor being rotatable in either of a forward direction or a reverse direction in response to the flow of pressurized fluid.

8. The modular robot of claim 1, further comprising camera means mounted to the body for generating visual data signals from objects around said modular robot.

9. A modular robot comprising:

a manifold having a plurality of fluid passages contained therein, wherein said manifold comprises a generally rectangular member having a top surface, a bottom surface, a right side, a left side, a front side, and a back side, and wherein said plurality of fluid passages comprise a common supply passage connected to a supply of pressurized fluid, a common vent passage, and a plurality of leg passages, some of said plurality of fluid passages terminating in a plurality of valve ports located on the bottom surface of said manifold;

valve module means removably connected to said manifold for selectively fluidically connecting at least one of the plurality of fluid passages contained in said manifold to the supply of pressurized fluid and to a vent;

control module means removably connected to said valve module means for controlling said valve module means to selectively control a flow of the pressurized fluid through selected ones of the plurality of fluid passages in said manifold, wherein said manifold, said valve module means, and said control means comprise a body; and a plurality of leg assemblies removably connected to the body and removably fluidically connected to the fluid passages in said manifold, wherein each of said plurality of leg assemblies is selectively actuated by the flow of pressurized fluid in selected ones of the plurality of fluid passages in said manifold to move said modular robot, wherein said plurality of leg assemblies includes a forward, a middle, and an aft leg assembly mounted to the right side of said manifold, and a forward, a middle, and an aft leg assembly mounted to the left side of said manifold.

10. The modular robot of claim 9, wherein said valve module means comprises:

a generally rectangular valve support member mounted to the bottom surface of said manifold, said valve support member having a top surface and a bottom surface, said valve support member also including a plurality of electrically conductive valve actuation circuit paths thereon; and a plurality of valves mounted to the top surface of said valve support member and engaging the plurality of valve ports located on the bottom surface of said manifold, each of said plurality of valves being electrically actuatable and electrically connected to the plurality of valve actuation circuit paths.

11. The modular robot of claim 10, wherein said control module means comprises:
a generally rectangular circuit board member mounted to the bottom surface of said valve support member, said circuit board member having a plurality of electrically conductive valve control circuit paths contained thereon;
control processor means mounted to said circuit board member and electrically connected to said valve control circuit paths for producing valve actuation signals; and
connector means mounted to said circuit board member for electrically connecting said plurality of valve control circuit paths with said plurality of valve actuation circuit paths contained on said valve support member.

12. A modular robot, comprising:
a main body having a structure that is defined by a plurality of stackable modules, wherein said plurality of stackable modules comprises
a manifold having a common supply passage, a common vent passage, and a plurality of leg passages therein, the common supply passage being fluidically connected to a supply of pressurized fluid;
a valve module comprising a plurality of valves removably connected to said manifold and responsive to valve actuation signals, each of said plurality of valves including an inlet and an outlet, at least one of said plurality of valves comprising a pressurizing valve and at least one of said plurality of valves comprising a venting valve, wherein the inlet and outlet of the pressurizing valve is connected to said manifold such that the inlet of the pressurizing valve is fluidically connected to the common supply passage in said manifold and such that the outlet of the pressurizing valve is fluidically connected to at least one of said plurality of leg passages in said manifold, and wherein the inlet and outlet of the venting valve are connected to said manifold such that the inlet of the venting valve is fluidically connected to at least one of said plurality of leg passages in said manifold and such that the outlet of the venting valve is fluidically connected to the common vent passage in said manifold;
a control module removably connected to said manifold and to each of said plurality of valves, said control module producing valve actuation signals for selectively opening and closing each of said plurality of valves, wherein said manifold, said valve module, and said control module are stackably mounted to one another and together define the structure of the main body; and
a plurality of leg assemblies removably connected to said main body and removably connected to said plurality of leg passages in said manifold, wherein each of said plurality of leg assemblies can be selectively actuated in response to flows of pressurized fluid controlled by said plurality of valves.

13. The modular robot of claim 12, wherein each of said plurality of valves may be proportionally varied from a no flow state to a full flow state.

14. The modular robot of claim 13, wherein each of said plurality of valves comprises a silicon microvalve.

15. The modular robot of claim 14, wherein each of said plurality of leg assemblies comprises:
an elongate upper leg member having a proximal end and a distal end, the proximal end of said elongate upper leg member being pivotally connected to said manifold so that said elongate upper leg member can be pivoted about a leg pivot axis;
a upper leg actuator connected to said manifold and to said elongate upper leg member and fluidically connected to one of said plurality of leg passages in said manifold, said upper leg actuator being responsive to the flow of pressurized fluid to move said elongate upper leg member back and forth about said leg pivot axis;
an elongate lower leg member having a ground engaging tip portion and being mounted to the distal end of said elongate upper leg member so that said ground engaging tip portion can be engaged with the ground, said ground engaging tip portion of said elongate lower leg member also being extendable and retractable and fluidically connected to one of said plurality of leg passages in said manifold so that said ground engaging tip portion of said elongate lower leg member can be extended and retracted in response to the flow of pressurized fluid to selectively engage and disengage the ground.

16. The modular robot of claim 15, wherein said upper leg actuator comprises a dual acting fluidic cylinder having a proximal end and a distal end, the proximal end of said dual acting fluidic cylinder being mounted to said manifold and the distal end of said dual acting fluidic cylinder being mounted to said elongate upper leg member, said dual acting fluidic cylinder being extendable and retractable and fluidically connected to one of said plurality of leg passages in said manifold so that said dual acting fluidic cylinder can be extended and retracted in response to the flow of pressurized fluid to move said elongate upper leg member back and forth about said leg pivot axis.

17. The modular robot of claim 15, wherein said upper leg actuator comprises:
a first single acting fluidic cylinder having a proximal end and a distal end, the proximal end of said first single acting fluidic cylinder being mounted to said manifold on one side of said elongate upper leg member and the distal end of said first single acting fluidic cylinder being mounted to said elongate upper leg member, said first single acting fluidic cylinder also being extendable and retractable and fluidically connected to one of the plurality of passages in said manifold so that said first single acting fluidic cylinder can be extended in response to the flow of pressurized fluid to move said elongate upper leg member in a first direction about said leg pivot axis; and
a second single acting fluidic cylinder having a proximal end and a distal end, the proximal end of said second single acting fluidic cylinder being mounted to said manifold on the other side of said elongate upper leg member and the distal end of said second single acting fluidic cylinder being mounted to said elongate upper leg member, said second single acting fluidic cylinder also being extendable and retractable and fluidically connected to one of the plurality of passages in said manifold so that said second single acting fluidic cylinder can be extended in response to the flow of pressurized fluid to move said elongate upper leg member in a second direction about said leg pivot axis.

18. A modular robot comprising:
a manifold having a common supply passage, a common vent passage, and a plurality of leg passages therein, the common supply passage being fluidically connected to a supply of pressurized fluid, and, wherein said manifold comprises a generally rectangular member having a top surface, a bottom surface, a right side, a left side, a front side and a back side;

a plurality of valves removably connected to said manifold and responsive to valve actuation signals, each of said plurality of valves including an inlet and an outlet, at least one of said plurality of valves comprising a pressurizing valve and at least one of said valves comprising a venting valve, wherein the inlet and outlet of the pressuring valve are connected to said manifold such that the inlet of the pressurizing valve is fluidically connected to the common supply passage in said manifold and so that the outlet of the pressurizing valve is fluidically connected to at least one of said plurality of leg passages in said manifold, and wherein the inlet and outlet of the venting valve are connected to said manifold such that the inlet of the venting valve is fluidically connected to at least one of said plurality of leg passages in said manifold and such that the outlet of the venting valve is fluidically connected to the common vent passage in said manifold, wherein each of said plurality of valves comprises a silicon microvalve that may be proportionally varied from a no flow state to a full flow state;

a control module removably connected to said manifold and to each of said plurality of valves, said control module producing valve actuation signals for selectively operating each of said plurality of valves between the no flow state and the full flow state; and a plurality of leg assemblies removably connected to said manifold and removably connected to said leg passages in said manifold, wherein each of said plurality of leg assemblies can be selectively actuated in response to flows of pressurized fluid controlled by said plurality of valves, wherein each of said plurality of leg assemblies comprises an elongate upper leg member having a proximal end and a distal end, the proximal end of said elongate upper leg member being pivotally connected to said manifold so that said elongate upper leg member can be pivoted about a leg pivot axis;

an upper leg actuator connected to said elongate upper leg member and fluidically connected to one of said plurality of leg passages in said manifold, said upper leg actuator being responsive to the flow of pressurized fluid to move said elongate upper leg member back and forth about said leg pivot axis;

an elongate lower leg member having a ground engaging tip portion and being mounted to the distal end of said elongate upper leg member so that said ground engaging tip portion can be engaged with the ground, said ground engaging tip portion of said elongate lower leg member also being extendable and retractable and fluidically connected to one of said plurality of leg passages in said manifold so that said ground engaging tip portion of said elongate lower leg member can be extended and retracted in response to the flow of pressurized fluid to selectively engage and disengage the ground;

wherein a forward, a middle, and an aft leg assembly are mounted to the right side of said manifold, and wherein a forward, a middle, and an aft leg assembly are mounted to the left side of said manifold, and wherein said plurality of valves are mounted to the bottom surface of said manifold.

19. The modular robot of claim 18, further comprising camera means mounted to the top surface of said manifold for generating visual data signals from objects around said modular robot.

20. The modular robot of claim 19, wherein the supply of pressurized fluid is provided by a tank filled with compressed carbon dioxide.

21. The modular robot of claim 12, wherein each of said plurality of leg assemblies comprises:

an elongate suspension member having a proximal end and a distal end, the proximal end being fixedly mounted to said manifold so that said distal end extends generally downward; and a wheel assembly mounted to the distal end of said elongate suspension member, said wheel assembly being fluidically connected to one of said plurality of leg passages and responsive to the flow of pressurized fluid.

22. The modular robot of claim 21, wherein said wheel assembly comprises a fluidic motor having a shaft and a wheel attached to the shaft of said fluidic motor, said fluidic motor being rotatable in either of a forward direction or a reverse direction in response to the flow of pressurized fluid.

23. The modular robot of claim 12, wherein the fluid is a gas.

24. The modular robot of claim 23, wherein the gas is air.

25. The modular robot of claim 12, wherein the fluid is a liquid.

26. The modular robot of claim 25, wherein the liquid comprises oil.

27. A modular walking robot, comprising:

a generally rectangular manifold having a top surface, a bottom surface, a right side, a left side, a front side, and a back side, and having a plurality of fluid passages contained therein, at least one of said plurality of fluid passages comprising a common supply passage connected to a supply of pressurized fluid, at least one of said plurality of fluid passages comprising a common vent passage, and at least two of said plurality of fluid passages comprising a plurality of leg passages, at least two of said plurality of fluid passages terminating in a plurality of valve ports located on the bottom surface of said manifold;

a generally rectangular valve support member mounted to the bottom surface of said manifold, said valve support member having a top surface and a bottom surface, said valve support member also including a plurality of electrically conductive valve actuation circuit paths thereon;

a plurality of valves mounted to the top surface of said valve support member and engaging the plurality of valve ports located on the bottom surface of said manifold, each of said plurality of valves being responsive to valve actuation signals and electrically connected to the plurality of valve actuation circuit paths, wherein each of said plurality of valves selectively controls a flow of pressurized fluid through selected ones of said plurality of fluid passages in said manifold;

a generally rectangular circuit board member mounted to the bottom surface of said valve support member, said circuit board member having a plurality of electrically conductive valve control circuit paths contained thereon;

control processor means mounted to said circuit board member and electrically connected to said valve control circuit paths for producing valve actuation signals;

connector means mounted to said circuit board member for electrically connecting said plurality of valve control circuit paths with said plurality of valve actuation circuit paths contained on said valve support member; and a plurality of leg assemblies removably connected to the right and left sides of said manifold and removably fluidically connected to said leg passages in said manifold, wherein each of said plurality of leg assemblies can be selectively actuated in response to flows of pressurized fluid controlled by said plurality of valves.

28. The modular robot of claim 27, wherein each of said plurality of leg assemblies comprises:
- an elongate upper leg member having a proximal end and a distal end, the proximal end of said elongate upper leg member being pivotally connected to said manifold so that said elongate upper leg member can be pivoted about a leg pivot axis;
- a upper leg actuator connected to said manifold and to said elongate upper leg member and fluidically connected to one of said plurality of leg passages in said manifold, said upper leg actuator being responsive to the flow of pressurized fluid to move said elongate upper leg member back and forth about said leg pivot axis; and
- an elongate lower leg member having a ground engaging tip portion and being mounted to the distal end of said elongate upper leg member so that said ground engaging tip portion can be engaged with the ground, said ground engaging tip portion of said elongate lower leg member also being extendable and retractable and fluidically connected to one of said plurality of leg passages in said manifold so that said ground engaging tip portion of said elongate lower leg member can be extended and retracted in response to the flow of pressurized fluid to selectively engage and disengage the ground.

29. The modular robot of claim 28, wherein said upper leg actuator comprises:
- a first single acting fluidic cylinder having a proximal end and a distal end, the proximal end of said first single acting fluidic cylinder being mounted to said manifold on one side of said elongate upper leg member and the distal end of said first single acting fluidic cylinder being mounted to said elongate upper leg member, said first single acting fluidic cylinder also being extendable and retractable and fluidically connected to one of the plurality of passages in said manifold so that said first single acting fluidic cylinder can be extended in response to the flow of pressurized fluid to move said elongate upper leg member in a first direction about said leg pivot axis; and
- a second single acting fluidic cylinder having a proximal end and a distal end, the proximal end of said second single acting fluidic cylinder being mounted to said manifold on the other side of said elongate upper leg member and the distal end of said second single acting fluidic cylinder being mounted to said elongate upper leg member, said second single acting fluidic cylinder also being extendable and retractable and fluidically connected to one of the plurality of passages in said manifold so that said second single acting fluidic cylinder can be extended in response to the flow of pressurized fluid to move said elongate upper leg member in a second direction about said leg pivot axis.

* * * * *